United States Patent [19]

Scully

[11] Patent Number: 4,921,269

[45] Date of Patent: May 1, 1990

[54] LANDING GEAR/STABILIZER FOR SMALL TRAILER

[75] Inventor: Andrew J. Scully, Oakland, Mich.

[73] Assignee: The United States of America as represented by the Secretary of the Army, Washington, D.C.

[21] Appl. No.: 276,252

[22] Filed: Nov. 25, 1988

[51] Int. Cl.⁵ .............................................. B60S 9/18
[52] U.S. Cl. .............................. 280/475; 280/763.1; 280/766.1; 248/354.1; 254/420; 254/424
[58] Field of Search ................ 280/475, 763.1, 766.1, 280/490.1; 248/352, 231.3, 316.3, 354.1; 254/420, 424; 74/531, 166; 188/67

[56] References Cited

U.S. PATENT DOCUMENTS

| | | | |
|---|---|---|---|
| 991,241 | 5/1911 | Rae | 188/67 X |
| 1,727,430 | 8/1928 | Gilkison | 280/763.1 |
| 2,162,181 | 6/1939 | Skinner | 248/354.1 |
| 2,388,308 | 11/1945 | Court | 280/763.1 |
| 2,990,190 | 6/1961 | Eriksen | 280/47.33 |
| 3,822,798 | 7/1974 | Nett | 280/763.1 X |
| 4,054,190 | 10/1977 | Wilkes | 188/67 |

Primary Examiner—Charles A. Marmor
Assistant Examiner—Wook Yoon
Attorney, Agent, or Firm—Peter A. Taucher; David L. Kuhn

[57] ABSTRACT

Disclosed is a utility trailer having one or more stabilizers attached thereto. The stabilizer is comprised of a pair of flat arms pivoted to the trailer and extending away therefrom, the arms defining holes disposed one above the other. A stanchion is vertically translatable through the holes in the arms and a spring in tension is stretched between the free end of the arms, whereby the free ends are biased toward each other and the edges of the arm holes bind against the stanchion to hold it in position. The arms may be pivoted away from each other to free the stanchion from the edges of the arm holes so as to allow the stanchion to be vertically translated to a new position relative to the trailer. A ground engaging foot is connected to the lower end of the stanchion.

2 Claims, 3 Drawing Sheets

LANDING GEAR/STABILIZER FOR SMALL TRAILER

GOVERNMENT INTEREST

The invention described herein may be manufactured, used, and licensed by or for the Government for governmental purposes without payment to me of any royalty thereon.

BACKGROUND AND SUMMARY

The invention herein pertains to a landing gear or stabilizer for a single-axle trailer typically pulled by a passenger car, light truck or all-purpose purpose military vehicle such as the U.S. Army's High Mobility Multi-Purpose Wheeled Vehicle (HMMWV). These trailers commonly haul a variety of small loads, such as snowmobiles, camping equipment, household goods or the military cargo normally carried by the U.S. Army's XM1071 cargo trailer. When these trailers are unhitched from the two vehicle to free it for non-towing duties, they are frequently supported in their horizontal, free standing positions by retractable legs or feet connected to the front of the trailer.

Single-axle trailers constructed with only a frontal support leg have a problem which occurs when loading or unloading them. A person entering the rear of a trailer to place or remove cargo therein will quite possibly tip the rear of the trailer downward, potentially injuring the person and cargo in the trailer. Additionally, at all times during loading or unloading of the trailer, care must be taken to avoid greater weight at the rear of the trailer than at the front thereof, whereby loading or unloading the trailer may be difficult or inconvenient.

My invention addresses and solves the problems described above. My invention comprises stabilizers at the rear corners of the trailer, each stabilizer being a leg-and-foot assembly for supporting the trailer. The stabilizers can be independently vertically repositioned to adjust the height of their ground engaging feet, whereby the stabilizers can support the trailer on uneven ground. The stabilizers are of space conserving construction which neither increases the space envelope occupied by the trailer nor intrudes into the trailer's cargo space. Additionally, the stabilizers can be used in conjunction with the retractable/extendable front support legs of the trailer to lift the trailer's wheels off the ground in order, for example, to replace a flat tire.

DETAILED DESCRIPTION

Figure 1:
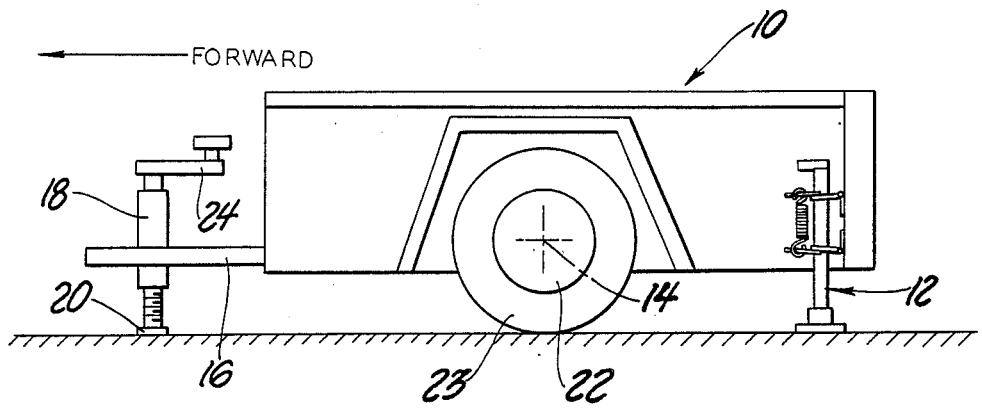
FIG. 1 is a side elevational view of a trailer showing one of my stabilizers thereon.
Figure 3:
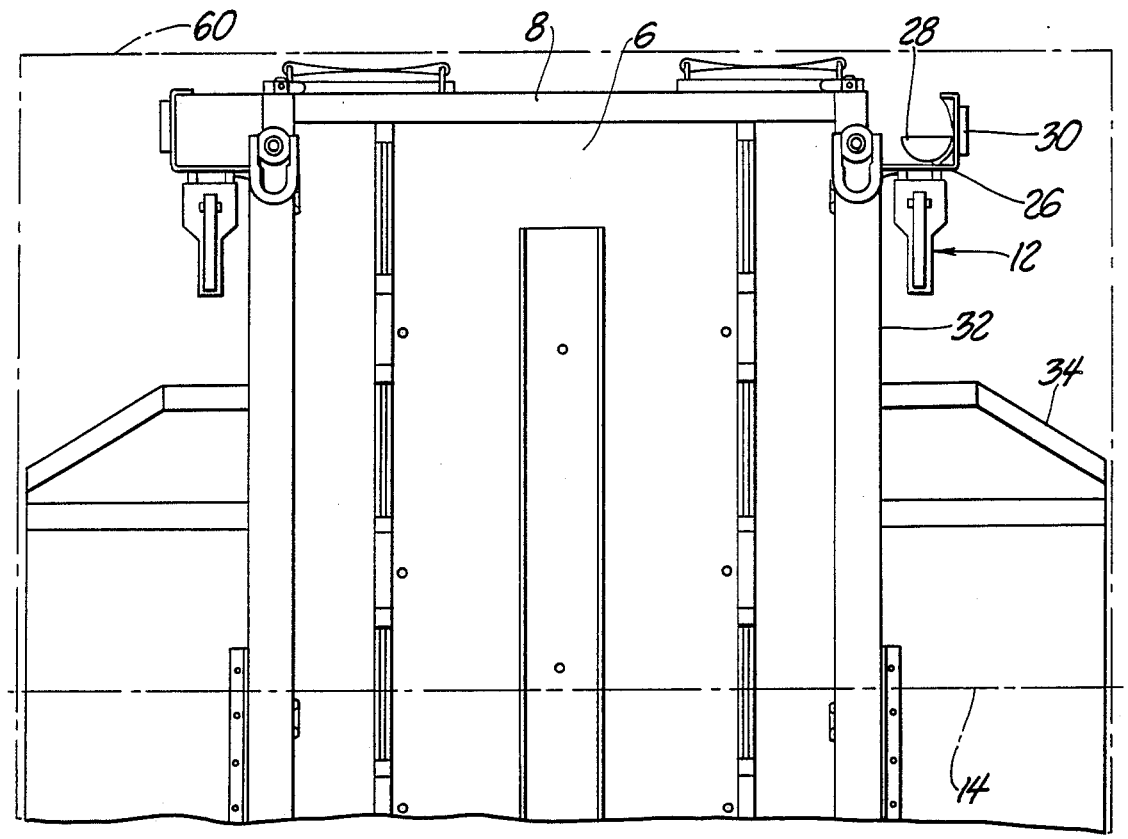
FIG. 3 is a top elevational view of the rear of the trailer and stabilizers thereon.

FIG. 1 shows a utility trailer 10, which can be the XM1071 high mobility, 1 ton cargo trailer currently used by the U.S. Army. Trailer 10 has wheels 22 and tires 23 rotatable on the single axle (not shown) of the trailer. The wheels 22 and the axle have a common rotational axis 14, with roughly half the trailer's weight being forward of axis 14 and half the trailer's weight being aft of axis 14. At the forward end of trailer 10 is draw bar 16 by which the trailer is hitched to an automotive vehicle (not shown). Attached to draw bar 16 is a screw jack unit 18, which raises and lowers a ground engagement foot 20 when handle 24 is turned. Behind axis 14, near either rear corner of trailer 10 is mounted an adjustable height stabilizer 12 to prevent the rear of trailer 10 from tilting downward when the trailer is standing alone. As seen in FIG. 3, trailer 10 has at its rear a gate 8 which can be swung down to facilitate entry into the trailer and provide a ramp to bed 6 of the trailer.

Figure 2:
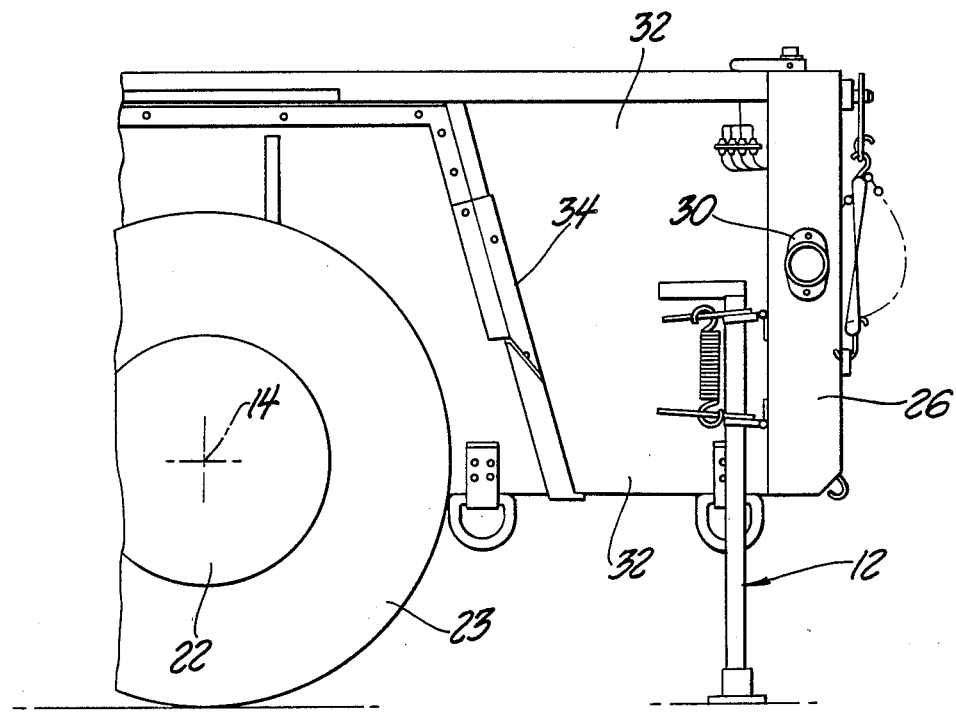
FIG. 2 is a detailed view of the rear of the trailer and stabilizer shown in FIG. 1.

Stabilizers 12 and the immediately surrounding areas of trailer 10 are shown in greater detail in FIGS. 2 and 3. Stabilizers 12 are mounted to elongate vertical brackets 26 which are L-shaped in cross section and which are disposed on trailer 10 at the rear corners thereof. Brackets 26 are fixed to and are disposed outboard of cargo wall 32, these brackets being used to mount and partially protect trailer lights 28 and 30 as well as the wiring for these lights. Forward of brackets 26 are fender wells 34, which are also fixed to and disposed outboard of trailer wall 32. The forward faces of brackets 26, the rear surfaces of fender wells 34 and the portions of walls 32 therebetween form three sided recesses in which stabilizers 12 are located. The recesses protectively prevent brush or branches from striking the stabilizer during over-terrain travel of trailer 10 when the stabilizers are in the up, retracted position. It should be noted that no portion of stabilizers 12 protrude out of the rectangular space envelope 60 (FIG. 3) into which trailer 10 fits, so that the stabilizers do not increase the overall length or width dimension of trailer 10.

Figure 4:
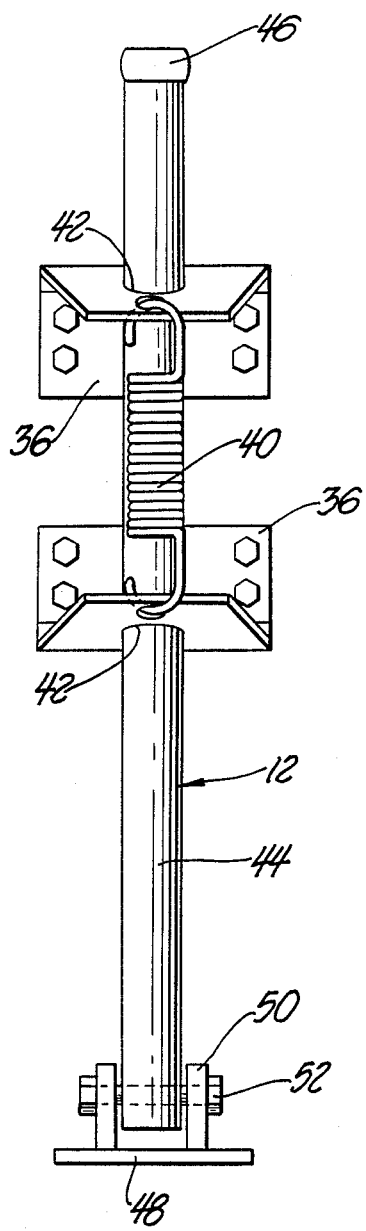
FIGS. 4 and 5 are enlarged front and side elevational views, respectively, of the stabilizer.
Figure 5:
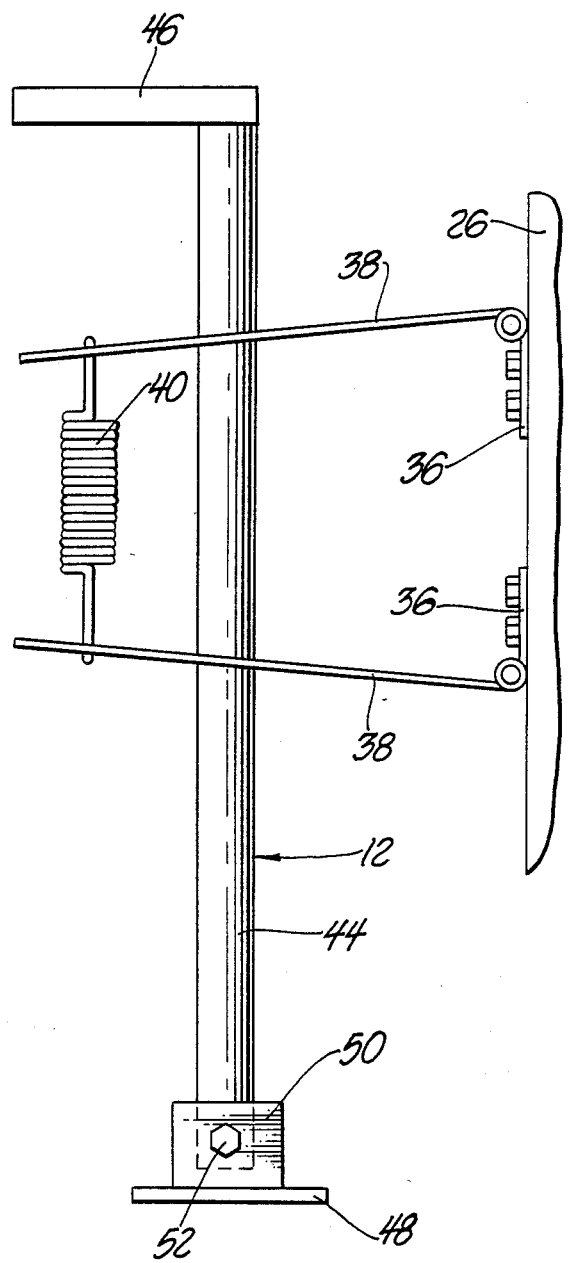
Figure 6:
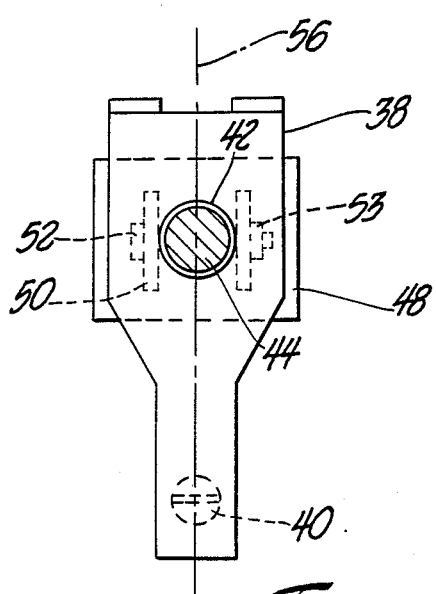
FIG. 6 is a top elevational view of the stabilizer showing the upper arm and stanchion in perpendicular relation.

A detailed view of stabilizer 12 and the structure by which it is fixed to bracket 26 is seen in FIGS. 4 and 5. Rectangular plates 36 are bolted or otherwise fixed one above the other to the forward face of bracket 26. Plates 36 are hinged at either their upper or lower edges so that flat, elongate arms 38 can be pivotally attached thereto. Connected between the unpivoted ends of arms 38 is a tension spring 40 which exerts a tension force preferably between 5 and 8 pounds in its FIG. 5 position. Intermediate the ends of arms 38 are circular apertures 42 in vertical alignment with one another, the best view of this aperture appearing in FIG. 6.

Passing vertically through apertures 42 in arms 38 is a stanchion 44 whose diameter is approximately the same as, but slightly smaller than, the diameter of these apertures. The looseness between stanchion 44 and arms 38 permits arms 38 a preferable maximum tilt between 3 and 10 degrees out of perpendicularity with stanchion 44. Once the maximum tilt is reached, arms 38 bind with stanchion 44 so that stachion 44 can not translate through apertures 42 in arms 36. As best seen in FIG. 5, spring 40 pulls arms 38 together so as to keep the arms angled toward each other at their maximum tilt out of perpendicularity with stanchion 44.

Fixed to and extending normally from the upper end of stanchion 44 is an elongate handle 46, which is disposed above and generally parallel to the forward, unhinged ends of arms 38. Hinged to the lower end of stanchion 44 is an articulated foot having a planar ground engaging base 48 and a pair of parallel upstanding walls 50, one wall on either side of the stanchion. The ground engaging base 48 includes a ground engagement plate having relatively thin edges for digging into the surface to counter horizontal creep of the body when the plate is faced against the surface. Axis pin 52 passes through the upstanding walls and through the stanchion so that the articulated foot can pivot forwardly or rearwardly on the stanchion.

To raise stabilizer 12 from its FIG. 5 position, the lower one of arms 38 is pivoted downward until it is horizontal, or exactly normal to stanchion 44. Then stabilizer 12 is raised by pulling upward on handle 46, the upper one of arms 38 being raised slightly by stanchion 44 so that the stanchion passes freely through aperture 42 in the upper arm 38. To lower stabilizer 12, the upper arm 38 is first pivoted upward to a horizontal position perpendicular to stanchion 44. Stanchion 44 can then be lowered by pushing downward on handle 46.

When stabilizers 12 are in their lowered or ground engaging positions, a load can be placed in the rear of trailer 10 without fear of tipping the trailer. In addition, arms 38 function as cantilever springs to absorb shocks during loading. When gate 8 is down, it is possible for a person to enter the rear of the trailer in order to place cargo therein without destabilizing the trailer. It is advantageous that the stanchions 44 of the stabilizers 12 can be lowered independently of each other and independently of screw jack unit 18, so that the trailer can be secured against rocking on uneven ground.

As an optional feature, screw jack unit 18 can be constructed so that it can be extended further downward relative to trailer 10 from its FIG. 1 position. Thus, when stabilizers 12 are lowered to the position shown in FIG. 1, screw jack unit can be extended further downward so as to raise trailer 10 and lift tire 23 off the ground. Tire 23 or wheel 22 can then be removed and replaced when, for example, a tire goes flat. Alternatively, rearward end of trailer 10 can be tilted upward after first retracting or raising screw jack unit 18. Then stabilizers 12 can be lowered until feet 48 engage the ground. Screw jack unit 18 can then be extended downward from the trailer until tire 23 leaves the ground.

Figure 7:
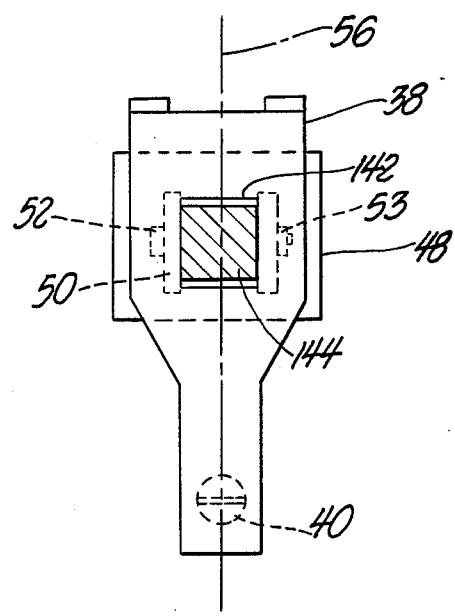
FIG. 7 is the same as FIG. 6 except that the cross-sectional shape of the stanchion is rectangular rather than round, and the holes in the arms are also rectangular rather than round.

A possible modification to stabilizer 12 is shown in FIG. 7 wherein stanchion 144 has a rectangular cross section instead of a circular cross section. Aperture 142 in plate 38 is rectangular and has two first opposed sides parallel to the longitudinal axis 56 of arm 36, the first opposed sides fitting closely against complimentary opposed sides of stanchion 144. Aperture 142 has two second opposed sides perpendicular to axis 56 which define slight gaps with the remaining two sides of the stanchion. The modified version of stabilizer 12 can be raised and lowered in the manner above described. However, the close fit between the first opposed sides of aperture 142 and the complimentary opposed sides of stanchion 144 prevent the stanchions from tipping outboard or inboard relative to trailer 10 when the stabilizers are supporting the trailer.

Another possible modification is to make foot 48 removable from stanchion 44, as by unthreading a nut 53 (FIGS. 6 and 7) from axis pin 52, removing the pin from the foot and then slipping the foot off stanchion 44. Once foot 48 is removed from stanchion 44 and spring 40 is removed from arms 38, the stanchion can be removed by pulling it upwards through arms 38. Arms 38 can then be folded down against bracket 26 or whatever other surface the arms 38 are mounted on, such as wall 32 of the cargo area, so that the arms occupy a minimum of space when the stabilizer is not in use. The removed parts (foot 48, spring 40, stanchion 44 pin 52. nut 53) of stabilizer 12 can be stored in trailer 10 or other convenient place.

I wish it to be understood that I do not desire to be limited to the exact details of the various constructions shown and described herein because obvious modifications may occur to those skilled in the relevant arts without departing from the scope of the following claims.

I claim:

1. In a utility trailer for off-road travel having a generally rectangular body for holding cargo, the body having a forward end, a rearward end, and two sides connecting the ends, a fender well affixed to the outboard face of each side, a single axle mounted transversely to the body between the ends thereof, a draw bar fixed to the forward end of the body, a screw jack fixed to the draw bar, a ground engagement foot vertically translatable by the screw jack, and a vertical elongate bracket fixed to either side of the trailer at the rear end of the body, the improvement comprising: a pair of elongate flat arms pivotally connected to each bracket and extending forward toward the fender wells, the arms being disposed one above the other and defining holes therein disposed above one another; one arm tilting downward in the forward direction and the other arm tilting upward in the forward direction; a tension spring connected between the free ends of the arms; a generally vertically oriented stanchion passing through the holes, the width of the holes along the longitudinal axis of the arms being slightly greater than the fore-to-aft width of the stanchions, whereby the arms have a limited range of pivotal movement in a fore-to-aft vertical plane; a handle extending normally and forwardly from the upper end of the stanchion; and a ground engagement foot pivotally connected to the lower end of the stanchion; wherein the fender well, the bracket and a portion of the trailer side define a recess into which the stanchion and foot can be retracted.

2. In a utility trailer having a generally rectangular body, the body having a forward end, a rearward end, and two sides connecting the ends, a fender well affixed to the outboard face of each side, a single axle mounted transversely to the body between the ends thereof, a draw bar fixed to the forward end of the body, a screw jack fixed to the draw bar, a ground engagement foot vertically translatable by the screw jack, and a vertical elongate bracket fixed to either side of the trailer at the rear end of the body, the improvement comprising: a pair of elongate arms pivotally connected to each bracket and extending forward toward the fender wells, the arms being disposed one above the other and defining holes therein disposed above one another; a tension spring connected between the free ends of the arms; a generally vertically oriented stanchion passing through the holes, the width of the holes along the longitudinal axis of the arms being slightly greater than the fore-to-aft width of the stanchions, whereby the arms have a limited range of pivotal movement in a fore-to-aft vertical plane; and a ground engagement foot connected to the lower end of the stanchion; wherein the fender well, the bracket and a portion of the trailer side define a recess into which the stanchion and foot can be retracted.

* * * * *